(12) United States Patent
Zamponi et al.

(10) Patent No.: US 12,466,573 B2
(45) Date of Patent: Nov. 11, 2025

(54) MECHANICAL POWER TRANSMISSION SYSTEM, GEARBOX AND AIRCRAFT

(71) Applicant: AIRBUS HELICOPTERS, Marignane (FR)

(72) Inventors: Laurent Zamponi, Vitrolles (FR); Félix Binder, Ensues la Redonne (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/746,807

(22) Filed: Jun. 18, 2024

(65) Prior Publication Data

US 2025/0100702 A1   Mar. 27, 2025

(30) Foreign Application Priority Data

Sep. 27, 2023   (FR) ...................... 2310240

(51) Int. Cl.
| | |
|---|---|
| *F16H 57/022* | (2012.01) |
| *B64C 27/12* | (2006.01) |
| *B64D 35/00* | (2006.01) |
| *F16H 57/00* | (2012.01) |
| *F16H 57/021* | (2012.01) |
| *F16H 57/028* | (2012.01) |

(52) U.S. Cl.
CPC ............ *B64D 35/00* (2013.01); *B64C 27/12* (2013.01); *F16H 57/0018* (2013.01); *F16H 57/021* (2013.01); *F16H 57/022* (2013.01); *F16H 2057/0225* (2013.01); *F16H 57/028* (2013.01)

(58) Field of Classification Search
CPC ..... B64D 35/00; B64C 27/12; F16H 57/0018; F16H 57/021; F16H 57/022; F16H 57/028; F16H 2057/0225; F16H 57/0006; F16H 2057/0012
See application file for complete search history.

(56) References Cited

U.S. PATENT DOCUMENTS

| | | | | |
|---|---|---|---|---|
| 3,051,008 | A  * | 8/1962 | Hamren | .................. F16H 21/14 |
| | | | | 74/18.1 |
| 5,286,117 | A | 2/1994 | Wojan et al. | |
| 2018/0015815 | A1 * | 1/2018 | Makino | ................. F16H 57/029 |

FOREIGN PATENT DOCUMENTS

| | | | | |
|---|---|---|---|---|
| DE | 102009013871 | B4 * | 5/2016 | ............... B60K 1/02 |
| EP | 1462677 | A1 * | 9/2004 | ............. F16H 1/321 |
| FR | 522428 | A | 7/1921 | |
| FR | 2988789 | A1 | 10/2013 | |

(Continued)

OTHER PUBLICATIONS

French Search Report for French Application No. FR2310240, Completed by the French Patent Office, Dated Apr. 8, 2024, 10 pages.

*Primary Examiner* — Justin Holmes
(74) *Attorney, Agent, or Firm* — BROOKS KUSHMAN P.C.

(57) ABSTRACT

The transmission system, including a drive shaft, a driven shaft and a connecting device enabling the drive shaft to transmit mechanical torque to the driven shaft, and guide devices guiding the drive shaft in rotation about a drive axis and guiding the driven shaft in rotation about a driven axis. When the transmission system is at a standstill, the drive axis and the driven axis are misaligned, and they move closer to one another when the transmission system transmits torque from the drive shaft to the driven shaft.

20 Claims, 3 Drawing Sheets

(56) References Cited

FOREIGN PATENT DOCUMENTS

FR 3057850 A1 4/2018
JP 2016205444 A * 12/2016

* cited by examiner

MECHANICAL POWER TRANSMISSION SYSTEM, GEARBOX AND AIRCRAFT

CROSS REFERENCE TO RELATED APPLICATION

This application claims the benefit of FR 23 10240 filed on Sep. 27, 2023, the disclosure of which is incorporated in its entirety by reference herein.

TECHNICAL FIELD

The present disclosure lies in the field of power transmission devices.

The present disclosure relates to a transmission system, a gearbox and an aircraft, and a method for limiting parasitic forces in such a transmission system. In particular, a transmission system can have the function of mechanically transmitting power between an engine and a rotor of an aircraft.

BACKGROUND

A known transmission system comprises a connecting device transferring rotational movement and mechanical torque from a drive shaft to a driven shaft. Moreover, the transmission system may comprise one or more guide devices for guiding the drive shaft and the driven shaft in rotation in relation to a support. Such guide devices may comprise, for example, ball bearings or roller bearings. Moreover, the drive shaft and the driven shaft are aligned and coaxial.

However, under certain operating conditions of the transmission system, the drive shaft and the driven shaft may be subjected to significant radial and indeed axial loads that are likely to result in deformations and movements causing them to move out of radial and/or angular alignment with one another. Such a misalignment may tend to generate parasitic forces in the power transmission system that are likely to result in wear and/or damage to the connecting device and/or the guide devices, and indeed to the drive shaft and/or the driven shaft.

Various solutions have been developed in order to at least limit the transmission of parasitic forces between the drive and driven shafts.

For example, document FR 3057850 describes a transmission system comprising a first shaft and a second shaft respectively secured to two coupling means. This transmission system also comprises a connecting system, referred to as a "flexible" connecting system, comprising at least one intermediate shaft connecting the two coupling means and passing longitudinally through the second shaft.

In addition, the length of the intermediate shaft may be maximized in order to minimize the effect of possible misalignment between the first shaft and the second shaft. Indeed, the longer the intermediate shaft is, the less significant the parasitic forces generated by a given misalignment between the first shaft and the second shaft are.

Additionally, or alternatively, the intermediate shaft may have intrinsic flexibility enabling it to tolerate misalignments between the first shaft and the second shaft in such a way as to limit the parasitic forces generated.

Furthermore, according to this document FR 3057850, the connecting device may comprise special coupling means for minimizing the impact of axial, radial and angular misalignments. These coupling means may be in the form of diaphragms or plate systems, for example.

According to another example, document U.S. Pat. No. 5,286,117 describes a rolling bearing whose outer ring is asymmetrical, meaning that assembling it in a cylindrical housing and around a shaft allows there to be a radial or axial clearance between this outer ring and the housing, only around part of the circumference of this outer ring. Therefore, this rolling bearing helps reduce the stresses resulting from a misalignment between the inner and outer rings of the rolling bearing in order to limit the load peaks on the rolling elements of the rolling bearing and the other parts of the system.

Alternative solutions exist. For example, document FR 2988789 describes a device for axially shimming a rolling bearing assembled on a shaft. This axial shimming device comprises an angular shimming means and an operating clearance allowing the rolling bearing limited angular displacement.

Document FR 522428 describes a resilient coupling between pinions and control shafts belonging to transmissions wherein toothed wheels can move in relation to one another.

According to one technology, the enclosure or casing of a transmission system may be very rigid in order to limit the amplitudes of misalignment between the shafts. Though effective, this solution has a cost in terms of weight.

SUMMARY

An object of the present disclosure is thus to propose an alternative power transmission system that is likely to minimize the transmission of parasitic forces, in particular between a drive shaft and a driven shaft of the transmission system during its operation.

According to the disclosure, a transmission system comprises a drive shaft, a driven shaft and a connecting device mechanically connecting the drive shaft and the driven shaft, the drive shaft rotating the driven shaft by means of the connecting device. The connecting device thus enables the drive shaft to rotate the driven shaft, and therefore to transmit rotational torque at least from the drive shaft to the driven shaft, and possibly also from the driven shaft to the drive shaft.

The transmission system also comprises at least two first housings and at least two first guide devices for guiding the drive shaft in rotation about a drive axis AXMA, each first housing accommodating one of the first guide devices. The transmission system also comprises at least two second housings and at least two second guide devices for guiding the driven shaft in rotation about a driven axis AXME, each second housing accommodating one of the second guide devices.

The transmission system may also comprise a casing wherein the first and second housings are formed. This casing may be a one-piece component or made from several assembled sub-assemblies.

The transmission system according to the disclosure is in particular remarkable in that the drive axis AXMA and the driven axis AXME are misaligned when the transmission system is at a standstill, the drive shaft and the driven shaft and the connecting device being situated around a center line LM of the drive axis AXMA and the driven axis AXME.

This center line LM is defined as being, in each plane perpendicular to this center line LM, equidistant from the drive axis AXMA and the driven axis AXME. The drive shaft, the driven shaft and the connecting device are situated around this center line LM, and are thus in line with one another, the connecting device being situated between the drive shaft and the driven shaft.

The drive axis AXMA and the driven axis AXME are therefore close to one another, but are not coaxial when the transmission system is at a standstill, i.e., when no mechanical torque is transmitted between the drive shaft and the driven shaft. A gap therefore separates the drive axis AXMA and the driven axis AXME.

Therefore, when the transmission system transmits mechanical torque, in particular from the drive shaft to the driven shaft, forces, that may also be referred to as "loads", bring the drive axis AXMA and the driven axis AXME closer together by reducing the gap separating them. This bringing together of the drive axis AXMA and driven axis AXME can proceed, in particular, until the drive axis AXMA and the driven axis AXME are substantially aligned and coaxial in predetermined conditions.

The aim of the initial misalignment between the drive axis AXMA and the driven axis AXME is therefore to anticipate and compensate for deformations and/or movements under load during the operation of the transmission system.

The bringing together of the drive axis AXMA and driven axis AXME makes it possible, during operation, to limit, or even prevent, the occurrence of parasitic forces in the transmission system, in particular at the drive shaft and driven shaft. The reduction or absence of such parasitic forces also helps limit the forces experienced by the connecting device and the guide devices of the transmission system, and by possible speed reduction devices that are likely to be situated upstream of the drive shaft and downstream of the driven shaft.

The reduction or absence of such parasitic forces advantageously helps to improve the operation of the transmission system and to increase its service life, thereby reducing the frequency of maintenance operations and/or the replacement of components.

The transmission system according to the disclosure may also make it possible to save weight compared with solutions that aim to make the transmission system more rigid.

Surprisingly, the misalignment of the drive axis AXMA and driven axis AXME when at rest is compatible with the operation of the transmission system, in particular when it is started up or when low mechanical torque is transmitted by the drive shaft to the driven shaft. Indeed, in these conditions, the connecting device and the possible speed reduction devices accept such a misalignment without their operation being affected.

The method according to the disclosure may comprise one or more of the following features, taken individually or in combination.

According to one example, the connecting device may comprise at least one drive device enabling the drive shaft to transmit mechanical torque to the driven shaft.

The connecting device and/or such a drive device may comprise no speed reduction device, in which case the drive shaft and the driven shaft rotate at substantially the same speed when the drive shaft is transmitting mechanical torque to the driven shaft.

Moreover, said at least one drive device may be permanent, and supply mechanical torque in a similar manner from the drive shaft to the driven shaft or from the driven shaft to the drive shaft. Alternatively, said at least one drive device may be non-permanent, and in particular supply engine torque only from the drive shaft to the driven shaft.

Said at least one drive device may, for example, comprise a device chosen from a list comprising splines, at least one key, a bolted assembly, a free-wheel, a clutch, a diaphragm coupling means.

The connecting device may comprise an intermediate shaft, said at least one drive device comprising a first drive device and a second drive device, the first drive device transmitting mechanical torque at least from the drive shaft to the intermediate shaft and the second drive device transmitting mechanical torque at least from the intermediate shaft to the driven shaft. In this case, the drive shaft, the intermediate shaft and the driven shaft may be substantially aligned and coaxial when the drive axis AXMA and the driven axis AXME move under loads during the operation of the transmission system.

According to another example compatible with the preceding examples, the drive axis AXMA and the driven axis AXME may be parallel to one another when the transmission system is at a standstill.

Alternatively, the drive axis AXMA and the driven axis AXME may be inclined in relation to one another, and therefore not parallel to one another, when the transmission system is at a standstill. The gap separating the drive axis AXMA and the driven axis AXME is, in this case, an angular gap.

According to another example compatible with the preceding examples, each first guide device, arranged in a first housing, may comprise a first center of rotation, about which a first inner ring of the first guide device rotates relative to a first outer ring of the first guide device. Similarly, each second guide device, arranged in a second housing, comprises a second center of rotation, about which a second inner ring of the second guide device rotates relative to a second outer ring of the second guide device. The first centers of rotation and the second centers of rotation are respectively situated on planes de symmetry of the first and second guide devices, for example.

The drive axis AXMA then passes through the first centers of rotation, and the driven axis AXME passes through the second centers of rotation. The drive axis AXMA is thus defined by the first centers of rotation and the driven axis AXME is defined by the second centers of rotation.

The value of the misalignment between the drive axis AXMA and the driven axis AXME is thus defined by the relative positions of the first and second centers of rotation.

In particular, if the drive axis AXMA and the driven axis AXME are parallel to one another when the transmission system is at a standstill, the relative positions of the first centers of rotation respectively in relation to the second centers of rotation are identical.

Alternatively, if the drive axis AXMA and the driven axis AXME are not parallel to one another when the transmission system is at a standstill, the relative positions of the first centers of rotation respectively in relation to the second centers of rotation are different.

According to a first variant of the transmission system according to the disclosure, the first housings are cylindrical and centered on the drive axis AXMA, and the second housings are cylindrical and centered on the driven axis AXME when the transmission system is at a standstill. In this case, the first housings and the second housings are not coaxial.

The misalignment between the drive axis AXMA and the driven axis AXME is thus obtained directly from the relative positions of the first housings and the second housings. In this case, the first guide devices and the second guide devices conventionally comprise coaxial inner and outer rings.

According to a second variant of the transmission system according to the disclosure, the first housings and the second housings are cylindrical, and are coaxial when the transmission system is at a standstill, and at least one of the first guide devices and second guide devices comprises an eccentric outer ring.

This eccentric outer ring comprises an external peripheral surface and an internal peripheral surface that are eccentric in relation to one another and therefore not coaxial. This eccentric outer ring therefore allows the center of rotation of the guide device in question to be moved in relation to the center of the housing wherein the guide device in question is arranged. In contrast, the inner ring of a guide device is coaxial with the internal peripheral surface of the associated eccentric outer ring. As a result, the inner ring of this guide device and the housing wherein this guide device is arranged are not coaxial.

The misalignment between the drive axis AXMA and the driven axis AXME is thus obtained by means of the eccentric outer ring of at least one of the first guide devices and second guide devices. For example, the two first guide devices each comprise a first eccentric outer ring, the second guide devices comprising second inner and outer rings that are coaxial.

According to a third variant of the transmission system according to the disclosure, the first housings and the second housings are cylindrical, and are coaxial when the transmission system is at a standstill, and at least one eccentric ring is inserted between one of the first housings and second housings, and one of the first guide devices and second guide devices.

This eccentric ring comprises an outer peripheral surface and an inner peripheral surface that are eccentric in relation to one another and therefore not coaxial. Therefore, this eccentric ring allows the center of rotation of the guide device around which the eccentric ring is inserted to be moved, in relation to the center of the housing wherein the eccentric ring is inserted. As a result, the guide device and the housing wherein this guide device is arranged are not coaxial.

The misalignment between the drive axis AXMA and the driven axis AXME is thus obtained by means of the eccentric ring or rings. For example, two eccentric rings are inserted respectively between the first housings and the two first guide devices.

According to a fourth variant of the transmission system according to the disclosure, the transmission system comprises a casing made up of several assembled sub-assemblies including at least a first sub-assembly and a second sub-assembly, the first sub-assembly comprising said at least two first housings and the second sub-assembly comprising said at least two second housings.

The first sub-assembly and the second sub-assembly are fastened to one another in such a way that the drive axis AXMA and the driven axis AXME are misaligned when the transmission system is at a standstill.

The first sub-assembly and the second sub-assembly are thus offset in relation to one another, compared with a position wherein the drive axis AXMA and the driven axis AXME would be aligned when the transmission system is at a standstill. In this case, the first sub-assembly and the second sub-assembly are also offset in relation to one another, compared with a position wherein the first housings and the second housings are coaxial when the transmission system is at a standstill, the first housings and the second housings being cylindrical.

The misalignment between the drive axis AXMA and the driven axis AXME is thus obtained by means of this offset between the first sub-assembly and the second sub-assembly. This offset may be obtained by the relative positions of the connection points between the first sub-assembly and the second sub-assembly, or by using an intermediate part adapted to the desired offset.

The first sub-assembly and the second sub-assembly may be fastened directly to one another, or by means of the intermediate part, for example a third sub-assembly of the casing.

The present disclosure also relates to a gearbox comprising a transmission system as described above.

The gearbox may, for example, be positioned between an engine and a propulsion device, such as a rotor if the gearbox is fitted to an aircraft.

The present disclosure also relates to an aircraft comprising a transmission system as described above, that may or may not be arranged in a gearbox.

The present disclosure finally relates to a method for limiting parasitic forces in a transmission system as described above.

This method comprises, in particular, the following steps:
  determining a relative movement between the drive axis AXMA and the driven axis AXME during operation of the transmission system; and
  when the transmission system is at a standstill, misaligning the drive axis AXMA and the driven axis AXME as a function of this relative movement.

This method therefore makes it possible to determine the value of the misalignment to be applied between the drive axis AXMA and the driven axis AXME when at rest. The value of this misalignment may be determined as a function of the relative movement between the drive axis AXMA and the driven axis AXME, that is itself determined by simulation and possibly confirmed by tests, or determined directly by tests.

During the step of determining a relative movement between the drive axis AXMA and the driven axis AXME, the relative movement between the drive axis AXMA and the driven axis AXME may, for example, be determined when the transmission system transmits mechanical torque that is greater than or equal to a predetermined torque from the drive shaft to the driven shaft. This predetermined torque may, for example, correspond to a particular operating phase of the transmission system, for example the operating phase that is the most demanding in terms of forces experienced by the transmission system, or the most used.

The relative movement between the drive axis AXMA and the driven axis AXME may alternatively be determined as being equal to an average relative movement between the drive axis AXMA and the driven axis AXME when the transmission system transmits mechanical torque from the drive shaft to the driven shaft that lies within a predetermined range. This predetermined range may, for example, correspond to one or more operating phases of the transmission system, in particular the operating phases that are the most demanding in terms of forces experienced, and/or the most used.

The relative movement between the drive axis AXMA and the driven axis AXME may be determined as being equal to an average relative movement between the drive axis AXMA and the driven axis AXME when the transmission system is in one or more predetermined operating phases, for example the operating phase or phases that are the most demanding in terms of forces experienced, or the most used.

When the transmission system according to the disclosure is fitted to a rotary-wing aircraft, for example being positioned between an engine and a rotor of the aircraft, the most demanding flight phases of the aircraft may be the take-off, cruising flight or stationary flight phases, and the most used flight phase is generally cruising flight.

However, directly measuring this relative movement between the drive axis AXMA and the driven axis AXME under load may be complex. In this case, during tests and/or simulation, parasitic forces, such as a moment and/or shear stress, can be measured in certain parts of the transmission system, and the relative positions of the drive axis AXMA and the driven axis AXME at a standstill are then modified iteratively in order to minimize these parasitic forces under load.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
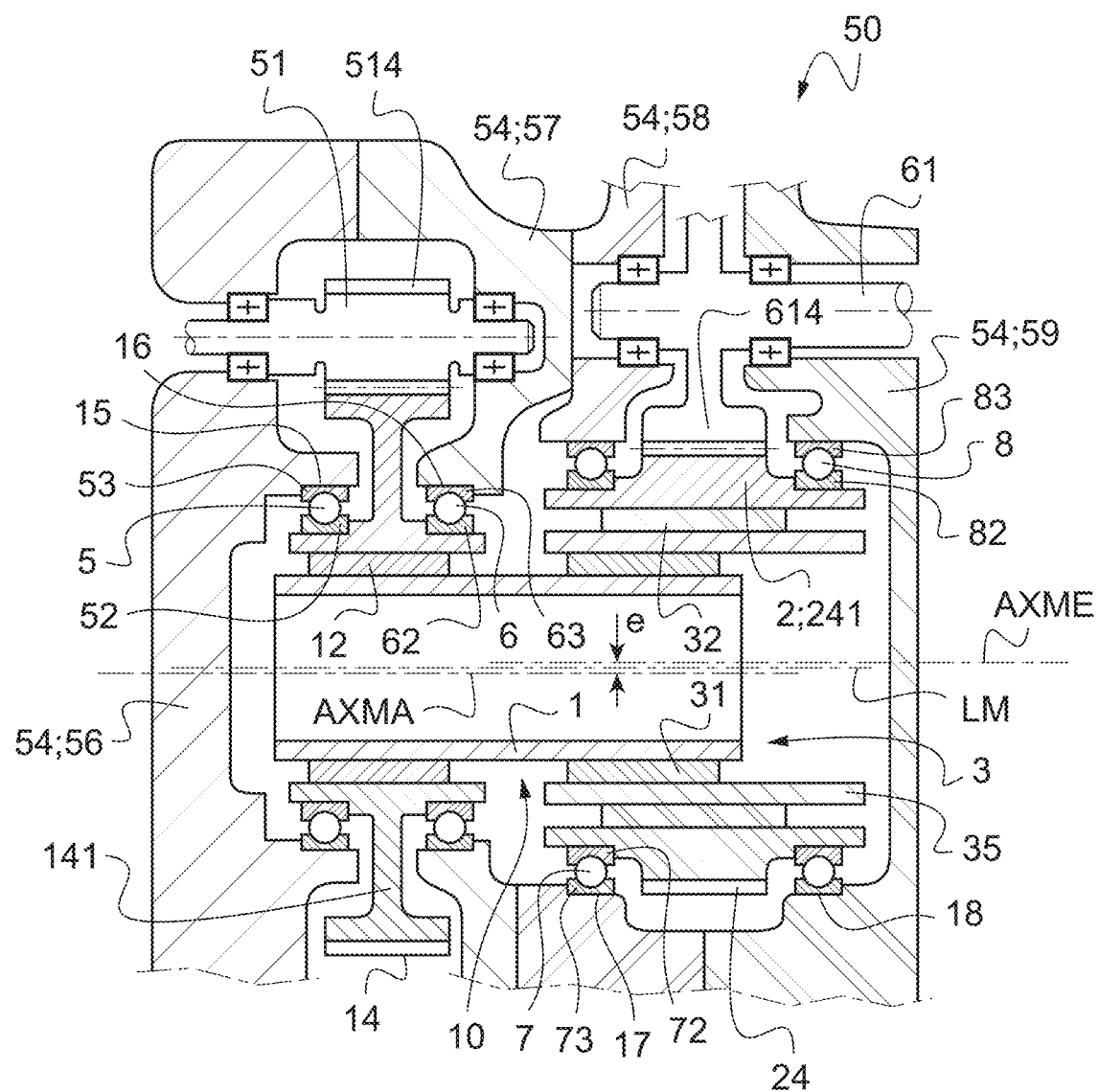
FIG. 1 is a view of a transmission system according to the disclosure incorporated into a gearbox.

FIG. 1 represents a transmission system 10 intended to transmit torque and mechanical power between a drive shaft 1 and a driven shaft 2. This transmission system 10 may, for example, be arranged between an engine and a propulsion device. This transmission system 10 may, for example, be incorporated into a gearbox 50 that is partially shown in FIG. 1.

Irrespective of how it is arranged, the transmission system 10 comprises a drive shaft 1, a driven shaft 2 and a connecting device 3 mechanically connecting the drive shaft 1 and the driven shaft 2. The connecting device 3 secures the drive shaft 1 and the driven shaft 2 at least in one direction of rotation, meaning that the drive shaft 1 rotates the driven shaft 2 at least in this direction by transmitting mechanical torque to it. To this end, the connecting device 3 comprises at least one drive device 31, 32.

A drive device 31, 32 may, for example, comprise a free-wheel allowing mechanical torque to be transmitted from the drive shaft 1 to the driven shaft 2 in a single direction of rotation. Alternatively, a drive device 31, 32 may comprise splines arranged in a complementary manner on the drive shaft 1 and the driven shaft 2, at least one key, or indeed a bolted assembly for transmitting mechanical torque from the drive shaft 1 to the driven shaft 2 in the two directions of rotation. A drive device 31, 32 may also comprise a clutch.

According to the example of the transmission system 10 of FIG. 1, the connecting device 3 may also comprise an intermediate shaft 35, a first drive device 31 and a second drive device 32. The first drive device 31 transmits mechanical torque from the drive shaft 1 to the intermediate shaft 35 and the second drive device 32 transmits mechanical torque from the intermediate shaft 35 to the driven shaft 2. According to the example of the transmission system 10, the first drive device 31 comprises splines and the second drive device 32 comprises a free-wheel.

The transmission system 10 also comprises at least two first housings 15, 16 and at least two respective first guide devices 5,6 for guiding the drive shaft 1 in rotation about a drive axis AXMA. Each first housing 15, 16 accommodates one of the first guide devices 5,6.

Furthermore, the transmission system 10 comprises at least two second housings 17, 18 and at least two respective second guide devices 7,8 for guiding the driven shaft 2 in rotation about a driven axis AXME in relation to a casing 54 of the gearbox 50. Each second housing 17, 18 accommodates one of the second guide devices 7,8.

The first and second housings 15-18 may be cylindrical and arranged/formed in the casing 54 of the gearbox 50. This casing 54 may comprise several sub-assemblies 56-59, as shown in FIG. 1, these sub-assemblies 56-59 possibly being assembled to one another by means of screws, for example.

Therefore, according to the example of the transmission system 10 shown in FIG. 1, the transmission system 10 comprises two first housings 15, 16, respectively arranged in two sub-assemblies 56,57, and two second housings 17, 18, respectively arranged in two sub-assemblies 58,59.

Moreover, the guide devices 5-8 comprise, for example, bearings comprising an inner ring 52, 62, 72, 82 and an outer ring 53, 63, 73, 83 enclosing rolling elements, i.e., balls or rollers, for example.

Each first guide device 5,6 comprises a first center of rotation around which the drive shaft 1 is guided in rotation. The drive axis AXMA thus passes through the first centers of rotation. Similarly, each second guide device 7,8 comprises a second center of rotation, around which the driven shaft 2 is guided in rotation. The driven axis AXME thus passes through the second centers of rotation. The drive axis AXMA is thus defined by the positions of the first centers of rotation and the driven axis AXME is defined by the positions of the second centers of rotation.

The drive shaft 1 and the driven shaft 2 may also comprise teeth 14, 24 in order to cooperate respectively with an input shaft 51 and an output shaft 61 of the gearbox 50.

According to one example, the drive shaft 1 may bear the teeth 14, the first guide devices 5, 6 guiding the drive shaft 1.

According to the example of the transmission system 10 of FIG. 1, the drive shaft 1 may comprise a driving toothed wheel 141 provided with the teeth 14. This driving toothed wheel 141 is constrained to rotate with the drive shaft 1 by a complementary drive device 12. The driving toothed wheel 141 is directly or indirectly guided in rotation by the first guide devices 5, 6. The first guide devices 5, 6 possibly guide the drive shaft 1 by guiding the driving toothed wheel 141. This driving toothed wheel 141 cooperates with an input toothed wheel 514 secured to the input shaft 51. In this way, the drive shaft 1 may be set in rotation, for example by an engine, via the input shaft 51 and the input toothed wheel 514 and the driving toothed wheel 141.

Similarly, the driven shaft 2 may comprise a driven toothed wheel 241 provided with teeth 24 cooperating with an output toothed wheel 614 constrained to rotate with the output shaft 61. The driven toothed wheel 241 is directly or indirectly guided in rotation by the second guide devices 7, 8. According to the example of FIG. 1, the driven shaft 2 and the driven toothed wheel 241 form one and the same part.

Therefore, when the drive shaft 1 transmits mechanical torque in rotation to the driven shaft 2, this mechanical torque is transmitted to the output shaft 61, possibly at a reduced ratio, depending on the number of teeth 24 and the number of teeth of the output toothed wheel 614. A system of the wheel drive shaft type may be envisaged.

Irrespective of these aspects, the drive axis AXMA and the driven axis AXME are misaligned, and therefore are not coaxial, when the transmission system 10 is at a standstill. Indeed, a gap separates the drive axis AXMA and the driven axis AXME when the transmission system 10 is at a standstill or is not transmitting any torque from the drive shaft 1 to the driven shaft 2. Furthermore, the drive shaft 1 and the driven shaft 2 and the connecting device 3 are situated around a center line LM that is in a center position between the drive axis AXMA and the driven axis AXME.

Figure 2:
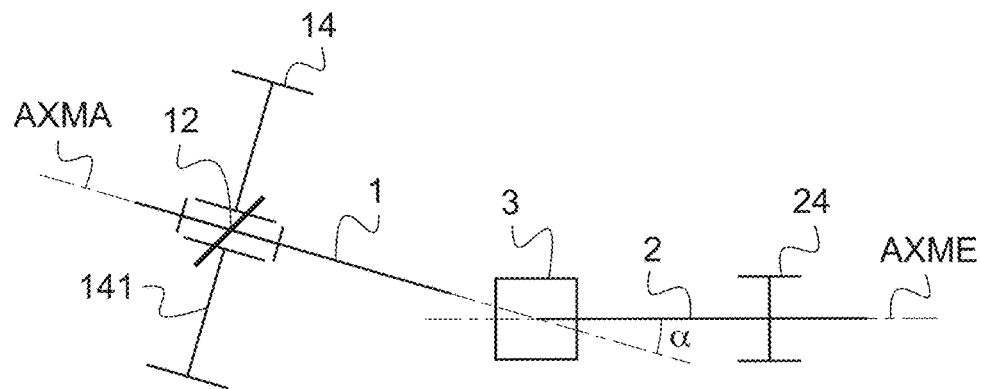
FIG. 2 is a schematic view of a transmission system according to the disclosure.

This gap may be in the form of a distance e, as shown in FIG. 1, the drive axis AXMA and the driven axis AXME being parallel to one another. This gap may be in the form of an angle α, as shown in FIG. 2, the drive axis AXMA and the driven axis AXME then being inclined in relation to one another, and therefore not parallel to one another. This FIG. 2 schematically shows only the drive shaft 1, the driven shaft 2 and the connecting device 3, and the driving toothed wheel 141. Such a misalignment between the drive axis AXMA and the driven axis AXME may also be defined simultaneously by a distance e and an angle α.

In FIGS. 1 and 2, the gap between the drive axis AXMA and the driven axis AXME has been exaggerated deliberately in order to be clearly visible. The distance e is, for example, between 0.1 millimeter (mm) and 1 mm (0.1 mm and 1 mm). The angle α is, for example, between 0.1 degree) (°) and 1° (0.1° and 1°).

The value of this misalignment between the drive axis AXMA and the driven axis AXME, whether expressed as a distance and/or as an angle, does not prevent the transmission system 10 from operating, in particular when it is started up or when low torque is transmitted by the drive shaft 1 to the driven shaft 2. Indeed, the connecting device 3 and the input toothed wheel 514 and output toothed wheel 524 permit such a misalignment of the drive axis AXMA and driven axis AXME, without producing significant parasitic force as long as the transmitted torque remains low.

Advantageously, as the torque transmitted by the transmission system 10, and in particular from the drive shaft 1 to the driven shaft 2, increases, deformations and/or movements occur in the transmission system 10 according to the disclosure, in particular at the drive shaft 1 and/or the driven shaft 2. These deformations and/or movements tend to move/deform the drive shaft 1 and/or the driven shaft 2 in such a way as to reduce the misalignment between the drive axis AXMA and the driven axis AXME, these drive axis AXMA and driven axis AXME advantageously moving closer to one another, possibly until they are coaxial and aligned.

Therefore, when the couple transmitted by the transmission system 10 increases, the misalignment between the drive axis AXMA and the driven axis AXME is reduced, that has the effect of limiting the occurrence of parasitic forces in the transmission system 10 and limiting the effects of these parasitic forces on the transmission system 10 and its components, such as the guide devices 5-8, the casing 54, the drive device or devices 31, 32 and the teeth 14, 24, as well as the possible input toothed wheel 514 and output toothed wheel 524. As a result, these components are subjected to less stress, helping to limit maintenance operations and, consequently, the cost of using the transmission system 10 according to the disclosure.

Figure 3:
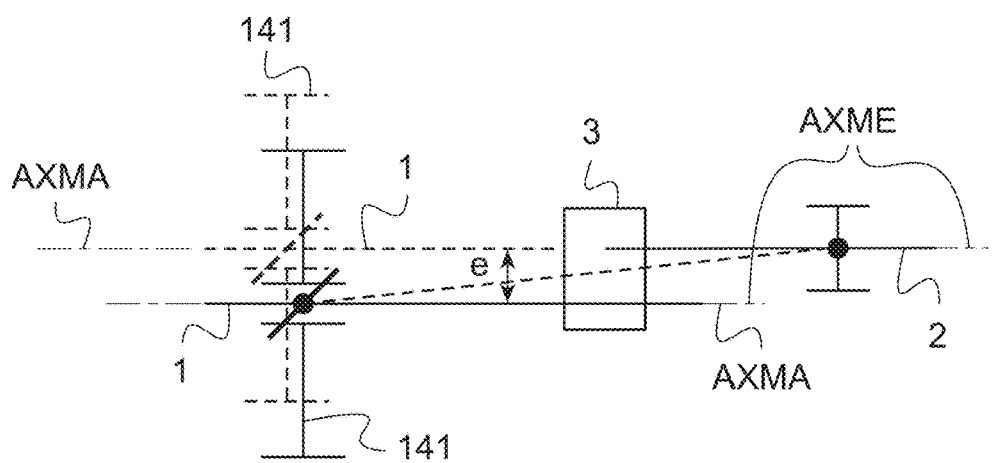
FIG. 3 is a schematic view comparing a transmission system according to the disclosure at a standstill and during operation.

FIG. 3 is a schematic view of the transmission system 10 at a standstill and during operation. The drive shaft 1 and the driving toothed wheel 141 are depicted by solid lines for the transmission system 10 at a standstill, and by dotted lines for the transmission system 10 during operation. The driven shaft 2 and the connecting device 3 are unchanged, regardless of whether the transmission system 10 is at a standstill or operating.

When the transmission system 10 is at a standstill, the drive shaft 1, that is depicted by solid lines, and the driven shaft 2 are not coaxial, the drive axis AXMA and the driven axis AXME being parallel to one another.

When the transmission system 10 is operating, the forces involved are such that the drive shaft 1, that is depicted by dotted lines, and the driven shaft 2 become substantially coaxial and aligned, the drive axis AXMA and the driven axis AXME also being substantially aligned.

In order for the transmission system 10 to be able to operate in this way when under loads, the misalignment between the drive axis AXMA and the driven axis AXME has been defined as a function of the relative movements under loads of the drive axis AXMA and the driven axis AXME during operation of this transmission system 10. It has been possible to determine these movements of the drive axis AXMA and the driven axis AXME by simulations and/or tests.

A method for limiting parasitic forces in the transmission system 10 may be used to determine the value of this initial misalignment.

This method comprises, first of all, a step of determining a relative movement between the drive axis AXMA and the driven axis AXME during operation of the transmission system 10. The value of this relative movement may be determined by simulation and/or tests.

This relative movement between the drive axis AXMA and the driven axis AXME for example, be determined when the transmission system 10 is in one or more particular operating phases of the transmission system 10. This or these particular operating phases may, for example, comprise the operating phase or phases that are the most demanding in terms of forces experienced, and/or the most used.

According to a first example, this relative movement may, for example, be determined when the transmission system 10 transmits mechanical torque that is greater than or equal to a predetermined torque from the drive shaft 1 to the driven shaft 2.

According to a second example, this relative movement may be determined as being equal to an average relative movement between the drive axis AXMA and the driven axis AXME when the transmission system 10 transmits mechanical torque that lies within a predetermined range from the drive shaft 1 to the driven shaft 2.

According to a third example, this relative movement may be determined as being equal to an average relative movement between the drive axis AXMA and the driven axis AXME when the transmission system 10 is operating in the operating phase or phases that are the most demanding in terms of forces experienced or the most used.

This method next comprises a step of misaligning the drive axis AXMA and the driven axis AXME as a function of this relative movement when the transmission system 10 is at a standstill.

This method therefore makes it possible to determine the value of the misalignment to be applied between the drive axis AXMA and the driven axis AXME when at rest. For example, this misalignment is equal to the value of the relative movement that has already been determined.

In order to obtain this misalignment between the drive axis AXMA and the driven axis AXME, the first center of rotation of at least one of the first guide devices 5,6 and/or the second center of rotation of at least one of the second guide devices 7,8 is offset from a theoretical position wherein the drive axis AXMA and the driven axis AXME are coaxial and aligned. This offset of a first or second center of rotation may be achieved only radially with respect to the drive axis AXMA or the driven axis AXME, i.e., in a plane passing through this theoretical position and perpendicular to the drive axis AXMA or to the driven axis AXME. This offset of the first or second center of rotation may also combine such a radial offset and an axial offset, parallel to the drive axis AXMA or to the driven axis AXME.

The center of rotation of only one of the first and second guide devices 5-8 may be offset in order to obtain the desired misalignment between the drive axis AXMA and the driven axis AXME, in particular when the drive axis AXMA and the driven axis AXME are not parallel to one another while the transmission system 10 is at a standstill.

The first centers of rotation of all of the first guide devices 5,6 or the second centers of rotation of all of the second guide devices 7,8 may be offset in order to obtain the desired gap between the drive axis AXMA and the driven axis AXME. The offsets will be the same for each of the first guide devices 5, 6 or second guide devices 7,8 if the drive axis AXMA and the driven axis AXME are parallel to one another when the transmission system 10 is at a standstill. The offsets will be different for each of the first guide devices 5,6 or second guide devices 7,8 if the drive axis AXMA and the driven axis AXME are not parallel to one another when the transmission system 10 is at a standstill.

Irrespective of whether or not the drive axis AXMA and the driven axis AXME are parallel, the first centers of rotation of all of the first guide devices 5,6 and the second centers of rotation of all of the second guide devices 7, 8 may also be offset.

Several technical solutions may be envisaged in order to obtain the desired offset of a center of rotation of one of the guide devices 5-8.

According to a first variant, the offset of the first or second center of rotation of one or more of the first guide devices 5, 6 and/or second guide devices 7,8 may be obtained by virtue of the position of the corresponding first housings 15, 16 and/or second housings 17, 18. In this case, the first housings 15, 16 and the second housings 17, 18 are not coaxial when the transmission system 10 is at a standstill, as shown in FIG. 1. The first housings 15,16 are in this case centered on the drive axis AXMA and the second housings 17, 18 are centered on the driven axis AXME. This offset of the first or second center of rotation of one or more of the guide devices 5-8 is obtained, for example, by machining the corresponding housing or housings 15-18 in the casing 54.

According to a second variant, the offset of the first or second center of rotation of one or more of the first guide devices 5, 6 and/or second guide devices 7,8 may be obtained by virtue of the guide device or devices 5-8 in question. In this case, all of the first housings 15, 16 and the second housings 17, 18 are coaxial when the transmission system 10 is at a standstill. Conversely, the first or second guide device or devices 5-8 in question are eccentric, i.e., their first or second center of rotation is eccentric in relation to the center of the housing 15-18 wherein this guide device 5-8 is positioned.

Figure 4:
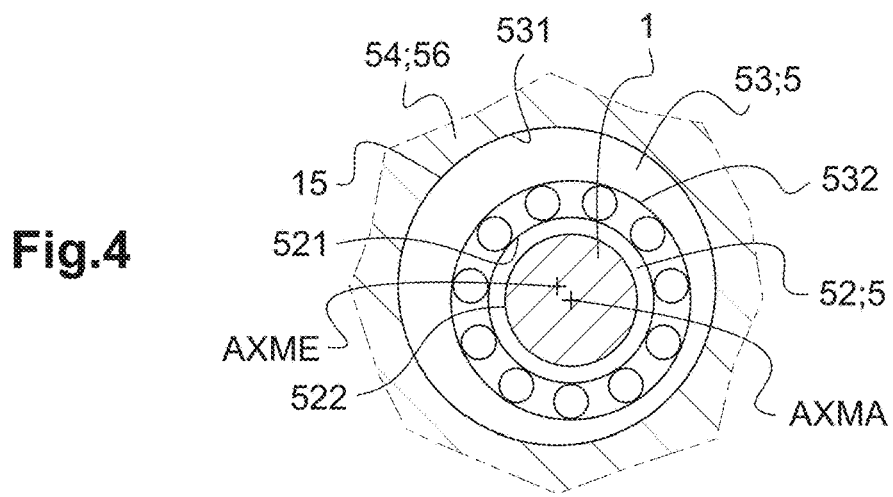
FIG. 4 is a partial view of a transmission system according to the disclosure.

For example, FIG. 4 shows a first housing 15 and a first guide device 5 according to this second variant. The first housing 15 is coaxial with the other first and second housings 16-18 and centered, for example, on the driven axis AXME. The first guide device 5 comprises an eccentric outer ring 53 and a "conventional", i.e., annular, inner ring 52. The external peripheral surface 531 of this eccentric outer ring 53 is centered on the driven axis AXME whereas the internal peripheral surface 532 of this eccentric outer ring 53 is centered on the drive axis AXMA. This external peripheral surface 531 and internal peripheral surface 532 are then eccentric and therefore not coaxial. Conversely, the "conventional" inner ring 52 comprises an internal peripheral surface 522 and an external peripheral surface 521 that are coaxial. The eccentricity of the eccentric outer ring 53 is equal to the desired offset of the first center of rotation of this first guide device 5.

According to a third variant, the offset of the first or second center of rotation of one or more of the first guide devices 5, 6 and/or second guide devices 7,8 may be obtained using an eccentric ring 9 inserted between the housing 15-18 and the guide device 5-8 in question. In this case, all of the first housings 15,16 and the second housings 17,18 are coaxial when the transmission system 10 is at a standstill. The first housings 15, 16 and the second housings 17, 18, and one of the first guide devices 5, 6 and second guide devices 7,8 are, according to this third variant, "conventional" i.e., their inner rings 52, 62, 72, 82 and outer rings 53, 63, 73, 83 are respectively coaxial in pairs.

The eccentric ring 9 comprises two outer 91 and inner 92 peripheral surfaces that are eccentric in relation to one another, i.e., their respective centers are not coaxial.

Figure 5:
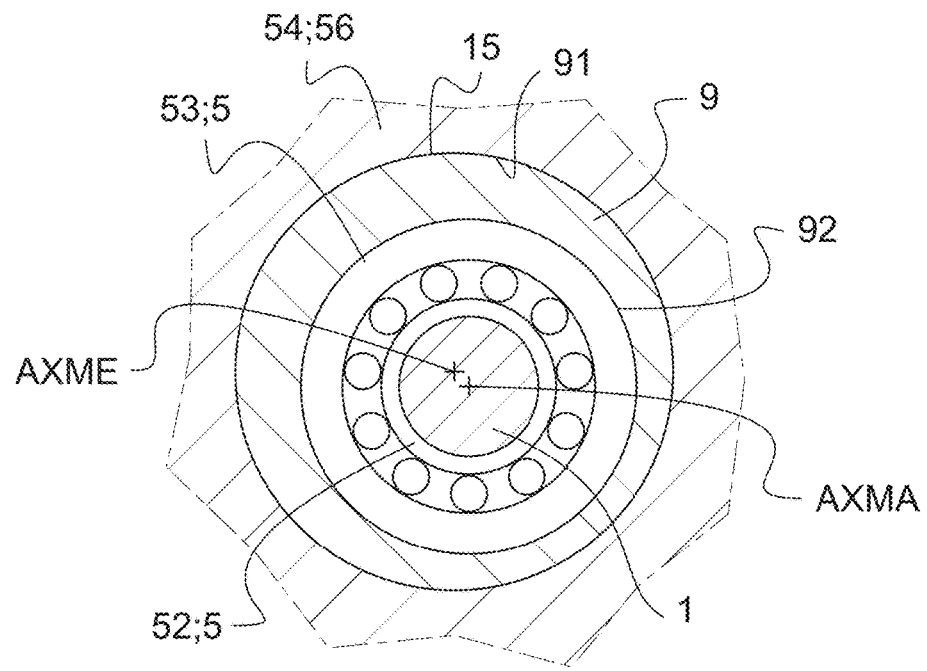
FIG. 5 is a partial view of a transmission system according to the disclosure.

An example of a third variant is shown in FIG. 5, wherein such an eccentric ring 9 is positioned in a first housing 15 and around a first guide device 5. The first housing 15 is coaxial with the other first and second housings 16-18 and centered, for example, on the driven axis AXME. The outer peripheral surface 91 of the eccentric ring 9 is centered on the driven axis AXME whereas the inner peripheral surface 92 of this eccentric ring 9 is centered on the drive axis AXMA. The outer peripheral surface 91 and inner peripheral surface 92 are thus eccentric and therefore not coaxial. The eccentricity of the eccentric ring 9 is equal to the desired offset of the first center of rotation of this first guide device 5.

According to a fourth variant, the transmission system 10 may comprise a casing 54 provided with at least a first sub-assembly 57 and a second sub-assembly 58. The first sub-assembly 57 comprises said at least two first housings 15, 16 and the second sub-assembly 58 comprises said at least two second housings 17, 18.

The first sub-assembly 57 and the second sub-assembly 58 are fastened to one another in order for the drive axis AXMA and the driven axis AXME to be misaligned when the transmission system 10 is at a standstill. An example of a fourth variant is shown in FIG. 1.

The first sub-assembly 57 and the second sub-assembly 58 are thus offset in relation to one another, compared with a position wherein the drive axis AXMA and the driven axis AXME would be aligned when the transmission system 10 is at a standstill. For example, the first sub-assembly 57 and the second sub-assembly 58 are offset in relation to one another, compared with a position wherein the first housings 15, 16 and the second housings 17, 18 are coaxial when the transmission system 10 is at a standstill. As a result, following this offset, the first housings 15,16 and the second housings 17, 18 are not coaxial when the transmission system 10 is at a standstill.

Figure 6:
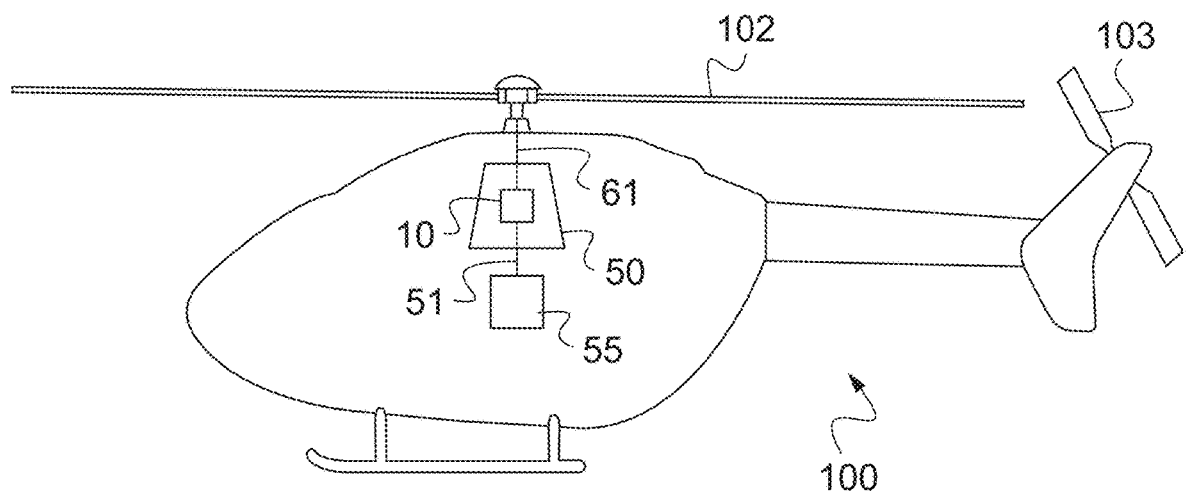
FIG. 6 is a view of an aircraft provided with a transmission system according to the disclosure.

The transmission system 10 can be fitted to an aircraft 100, and in particular to a gearbox 50 of this aircraft 100, as shown in FIG. 6. The gearbox 50 enables an engine 55 to rotate a lift rotor 102. The aircraft 100 may also comprise an auxiliary rotor 103 likely to be rotated by the engine 55, for example via the gearbox 50. The gearbox 50 comprises an input shaft 51 mechanically connected to the engine 55 and an output shaft 61 mechanically connected to the lift rotor 102.

When the transmission system 10 is fitted to such an aircraft 100, the particular operating phases of the transmission system 10, that are used, in particular, to determine the relative movement between the drive axis AXMA and the driven axis AXME, may be associated with flight phases of the aircraft 100, in particular the most demanding flight phases, that may be the take-off, cruising flight or stationary flight phases, and the most used flight phase is generally cruising flight.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A transmission system comprising a drive shaft and a driven shaft and a connecting device mechanically connecting the drive shaft and the driven shaft, the drive shaft rotating the driven shaft by means of the connecting device, the transmission system comprising at least two first housings and at least two first guide devices guiding the drive shaft in rotation about a drive axis, each first housing accommodating one of the first guide devices, the transmission system comprising at least two second housings and at least two second guide devices guiding the driven shaft in rotation about a driven axis, each second housing accommodating one of the second guide devices,
wherein the drive axis and the driven axis are misaligned when the transmission system is at a standstill, the drive shaft and the driven shaft and the connecting device being situated around a center line of the drive axis and the driven axis,
the drive shaft, the driven shaft and the connecting device being situated in line with one another, the connecting device being situated between the drive shaft and the driven shaft.

2. The transmission system according to claim 1,
wherein the connecting device comprises at least one drive device enabling the drive shaft to transmit mechanical torque to the driven shaft.

3. The transmission system according to claim 2,
wherein the connecting device comprises an intermediate shaft, the drive device(s) comprising a first drive device and a second drive device, the first drive device transmitting mechanical torque from the drive shaft to the intermediate shaft and the second drive device transmitting mechanical torque from the intermediate shaft to the driven shaft.

4. The transmission system according to claim 2,
wherein the drive device(s) comprise(s) a device chosen from a list comprising splines, at least one key, a bolted assembly, a free-wheel, a clutch.

5. The transmission system according to claim 1,
wherein the drive axis and the driven axis are parallel to one another when the transmission system is at a standstill.

6. The transmission system according to claim 1,
wherein the drive axis and the driven axis are inclined in relation to one another when the transmission system is at a standstill.

7. The transmission system according to claim 1,
wherein each first guide device comprises a first center of rotation about which a first inner ring of the first guide device rotates relative to a first outer ring of the first guide device, each second guide device comprises a second center of rotation about which a second inner ring of the second guide device rotates relative to a second outer ring of the second guide device, the drive axis passing through the first centers of rotation, the driven axis passing through the second centers of rotation.

8. The transmission system according to claim 1,
wherein the first housings and the second housings are cylindrical and are coaxial when the transmission system is at a standstill, and at least one of the first guide devices and the second guide devices comprises an eccentric outer ring, the eccentric outer ring comprising an external peripheral surface and an internal peripheral surface that are eccentric in relation to one another.

9. The transmission system according to claim 1,
wherein the first housings and the second housings are cylindrical and are coaxial when the transmission system is at a standstill, and the transmission system comprises at least one eccentric ring inserted between one of the first housings and the second housings, and one of the first guide devices and the second guide devices, the eccentric ring comprising an outer peripheral surface and an inner peripheral surface that are eccentric in relation to one another.

10. The transmission system according to claim 1,
wherein, the first housings and the second housings being cylindrical, the first housings are centered on the drive axis and the second housings are centered on the driven axis when the transmission system is at a standstill.

11. The transmission system according to claim 1,
wherein the transmission system comprises a casing made up of several assembled sub-assemblies including at least a first sub-assembly and a second sub-assembly, the first sub-assembly comprising the at least two first housings and the second sub-assembly comprising the at least two second housings, and the first sub-assembly and the second sub-assembly are fastened to one another in such a way that the drive axis and the driven axis are misaligned when the transmission system is at a standstill, the first sub-assembly and the second sub-assembly being offset in relation to one another, compared with a position wherein the drive axis and the driven axis would be aligned when the transmission system is at a standstill.

12. A gearbox comprising the transmission system according to claim 1.

13. An aircraft comprising the mechanical power transmission system according to claim 1.

14. A method for limiting parasitic forces in the transmission system according to claim 1,
the method comprising the following steps:
determining a relative movement between the drive axis and the driven axis during operation of the mechanical system; and
when the transmission system is at a standstill, misaligning the drive axis and the driven axis as a function of the relative movement.

15. The method according to claim 14,
wherein, during the step of determining a relative movement between the drive axis and the driven axis, the relative movement between the drive axis and the driven axis is determined when the transmission system transmits mechanical torque that is greater than or equal to a predetermined torque from the drive shaft to the driven shaft.

16. The method according to claim 14,
wherein, during the step of determining a relative movement between the drive axis and the driven axis, the relative movement between the drive axis and the driven axis is equal to an average relative movement between the drive axis and the driven axis when the transmission system transmits mechanical torque that lies within a predetermined range from the drive shaft to the driven shaft.

17. The method according to claim 14,
wherein, during the determination step, the relative movement between the drive axis and the driven axis is equal to an average relative movement between the drive axis and the driven axis when the transmission system is in one or more predetermined operating phases.

18. A transmission system comprising a drive shaft, a driven shaft and a connecting device mechanically connecting the drive shaft and the driven shaft, the drive shaft rotatable by the driven shaft by the connecting device, the transmission system comprising at least two first housings and at least two first guide devices to be able to guide the drive shaft in rotation about a drive axis, each first housing accommodating one of the first guide devices, the transmission system comprising at least two second housings and at least two second guide devices to be able to guide the driven shaft in rotation about a driven axis, each second housing accommodating one of the second guide devices,
wherein the drive axis and the driven axis are arranged to be misaligned when the transmission system is at a standstill, the drive shaft and the driven shaft and the connecting device being situated around a center line of the drive axis and the driven axis,
the drive shaft, the driven shaft and the connecting device being situated in line with one another, the connecting device being situated between the drive shaft and the driven shaft.

19. A gearbox comprising the transmission system according to claim 18.

20. An aircraft comprising a transmission system according to claim 18.

* * * * *